(12) United States Patent
Gish

(10) Patent No.: US 11,113,240 B2
(45) Date of Patent: Sep. 7, 2021

(54) METHODS AND SYSTEMS FOR DEPICTION OF PROJECT DATA VIA TRANSMOGRIFICATION USING FRACTAL-BASED STRUCTURES

(71) Applicant: Peter Antony Gish, Hanover, NH (US)

(72) Inventor: Peter Antony Gish, Hanover, NH (US)

(73) Assignee: Peter Antony Gish, Hanover, NH (US)

( * ) Notice: Subject to any disclaimer, the term of this patent is extended or adjusted under 35 U.S.C. 154(b) by 0 days.

(21) Appl. No.: 17/005,794

(22) Filed: Aug. 28, 2020

(65) Prior Publication Data

US 2021/0064574 A1 Mar. 4, 2021

Related U.S. Application Data

(60) Provisional application No. 62/892,749, filed on Aug. 28, 2019.

(51) Int. Cl.
*G06F 16/14* (2019.01)
*G06F 16/11* (2019.01)
*G06F 16/13* (2019.01)
*G06F 3/14* (2006.01)
*G06Q 10/10* (2012.01)

(52) U.S. Cl.
CPC .......... *G06F 16/156* (2019.01); *G06F 16/116* (2019.01); *G06F 16/13* (2019.01); *G06F 3/14* (2013.01); *G06Q 10/10* (2013.01)

(58) Field of Classification Search
CPC .......... G06N 5/02; G06F 9/44; G06F 16/156; G06F 16/116; G06F 16/13; G06F 3/14; G06Q 10/10
See application file for complete search history.

(56) References Cited

U.S. PATENT DOCUMENTS 5,899,995 A 5/1999 Millier et al.
5,960,437 A * 9/1999 Krawchuk .......... G06F 16/9024
707/702

(Continued)

FOREIGN PATENT DOCUMENTS

KR 100908295 B1 7/2009
WO WO-2007/071913 A1 6/2007

OTHER PUBLICATIONS

International Search Report for International Patent Application No. PCT/US2020/048409, dated Nov. 13, 2020 (6 pages).

(Continued)

*Primary Examiner* — Apu M Mofiz
*Assistant Examiner* — Farhad Agharahimi
(74) *Attorney, Agent, or Firm* — Goodwin Procter LLP

(57) ABSTRACT

In a system for efficiently organizing, storing, accessing, and analyzing project data and for visualizing project progress, for a specified project, a reference fractal-based structure is selected based on, at least in part, the type of the specified project and/or a mapping between project types and reference fractal-based structures. The project files are organized and stored in a file structure that corresponds to the selected reference fractal-based structure, so that the file structure can be transmogrified displayed as a viewable fractal-based structure, that can indicate process of different tasks and subtasks of the project based on, in part, the status of the tasks and subtasks that is derived from the project files.

20 Claims, 13 Drawing Sheets

(56) References Cited

U.S. PATENT DOCUMENTS

| | | |
|---|---|---|
| 6,792,418 B1 | 9/2004 | Binnig et al. |
| 6,854,088 B2 | 2/2005 | Massengale et al. |
| 6,944,622 B1 | 9/2005 | Mitchell et al. |
| 8,402,480 B2 | 3/2013 | Rohwer |
| 10,255,571 B2 | 4/2019 | Cantor et al. |
| 2008/0040690 A1 | 2/2008 | Sakai |
| 2011/0071869 A1* | 3/2011 | O'Brien ............... G06Q 10/103 |
| | | 705/7.12 |
| 2013/0066789 A1 | 3/2013 | Gaskell |
| 2015/0058412 A1* | 2/2015 | Hillerbrand ............ G06F 16/20 |
| | | 709/203 |
| 2015/0347477 A1* | 12/2015 | Esmet .................... G06F 16/13 |
| | | 707/744 |
| 2016/0210577 A1 | 7/2016 | Amundson et al. |
| 2019/0130357 A1 | 5/2019 | O'Toole |

OTHER PUBLICATIONS

Warchalowski and Krawczyk., "Line Graphs for fractals", Communications in Nonlinear Science and Numerical Simulation, Sep. 20, 2016, 44(1-60).

Written Opinion for International Patent Application No. PCT/US2020/048409, dated Nov. 13, 2020 (11 pages).

\* cited by examiner

METHODS AND SYSTEMS FOR DEPICTION OF PROJECT DATA VIA TRANSMOGRIFICATION USING FRACTAL-BASED STRUCTURES

CROSS-REFERENCE TO RELATED PATENT APPLICATIONS

This application claims priority to and the benefit of U.S. Provisional Patent Application No. 62/892,749, entitled "Methods and Systems for Depiction of Project Data via Transmogrification using Fractal-Based Structures" and filed on Aug. 28, 2019, the entire contents of which are incorporated herein by reference.

BACKGROUND

A typical project management system generally includes a computer server or cloud-computing based digital file and data management system that utilizes software. In most instances, physical copies of these files and data exist and are stored in a physical system like office drawers or folders. In typical systems, the method of uploading, organizing, sorting, storing, accessing and viewing files and data is manual and performed primarily or exclusively by humans. In these systems files and data are added in an ad hoc manner by humans and manually assigned to a specific digital or physical folder. When files or project data are placed in a specific folder or drawer they are siloed and cannot be viewed unless the user has pre-existing knowledge of the system and project data and can thereby manually recall the file or use a search engine to return it. Furthermore, in order to store files and project data, one must have pre-existing knowledge of the structure of the system otherwise project data can be misplaced or unnecessarily duplicated.

Due to the ad hoc nature of typical project management systems, these typical systems have two major shortfalls: they do not provide a visual depiction of the progress of the overall project in terms of its various tasks and subtasks, unless the status of these tasks and subtasks are entered into the system. They also do not provide feedback on or manage the project data. For example, if one opens a folder in a typical project management system, one can only see the contents of the open folder and the sub-contents of any sub-folders that are also open. In this case, one cannot see the relationship of the viewable project data to the project data that is contained within closed folders and sub-folders. Project data is oftentimes relevant to the progress of a project and therefore much of the significance of the project data is lost when one can't see the visual relationship. Furthermore, these typical systems do not provide feedback on or manage project data, provided in various files. For example, typical project management systems do not notify the user if a file's validity has expired or if the status of the progress has advanced/regressed due to the addition/deletion of a file(s).

Typical project management systems require significant manual user input, effort, and time. These project management systems are inefficient and do not adequately manage project data. Furthermore, existing project management systems fail to adequately provide two critical functions for project development: a visual depiction of the progress of the various tasks and subtasks and feedback on project data.

SUMMARY

In various embodiments, according to the techniques described herein, massive amounts of information can be quickly and intuitively grasped and understood by using algorithms to efficiently upload, sort, organize, store, and transpose project data and files into visual homologues which represent forms already familiar to the observer. Some embodiments include features to search and retrieve project data and files in a manner that relates to project progress.

Despite the human brain's remarkable ability to absorb information efficiently, understanding the architecture and content of large and complex sets of data remains a time consuming and at times extremely difficult proposition. The current limitations of project management systems do not facilitate the rapid cognition necessary for efficient and precise project development. These management systems themselves require a significant amount of human effort and time to implement and maintain with files, project data, and tasks and sub-tasks entered into the system manually.

Of all the senses, vision is the most powerful in terms of the quantity, quality and diversity of data that can be processed. The human brain processes visual information over 60,000 times quicker than other types of information.

Various embodiments described herein transmogrify and depict project data as visual homologues that have forms familiar to an observer and, as such, serve as a cognitive bridge and enable the user to efficiently access and view the information, search for and retrieve information, collect data on organizational methods, view history of user interaction with and manipulation of files an data, receive feedback on the project data, view project task and subtask progress, and view overall project progression.

Accordingly, in one aspect, a method is provided for efficiently organizing, storing, searching and retrieving, accessing, and analyzing project data and for visualizing project progress. The method includes: selecting for a specified project, a reference fractal-based structure based on, at least in part: (i) type of the specified project and (ii) a mapping between project types and reference fractal-based structures. The method also includes organizing and storing by a processor, that can be part of a cloud-based system, several project files in a file structure corresponding to the selected reference fractal-based structure. In addition, the method includes transmogrifying by the processor, or a cloud-based system, the file structure into a digitally produced viewable fractal-based structure, and displaying by the processor, or a cloud-based system, the viewable fractal-based structure.

In some embodiments, the reference structured is constructed using fractal geometry principles. In other embodiments, the reference structure is constructed using principles of Lindenmayer systems. In other embodiments, the reference structure can be hierarchal force directed or based on other sorting methods suitable for a large number of networks. In some embodiments, the reference structure may be constructed using a combination of the aforementioned methods.

The reference fractal-based structure may include a nature-based structure, and the viewable fractal-based structure may include the nature-based structure. The nature-based structure may include a tree structure or a plant structure, where the tree and/or plant structures include one or more branches and a number of leaves. A first branch in the one or more branches may include a second branch, e.g., a sub-branch, and the second branch may have one or more leaves.

In some embodiments, the file structure includes one or more folders respectively corresponding to the one or more branches, and each file from the several files corresponds to a respective leaf in the number of leaves or to a subset of the one or more branches or sub-branches. A first file in the several files may be associated with a first project task, and the viewable fractal-based structure may include a first branch corresponding to the first project task. The first file may indicate a status of the first project task and transmogrifying the file structure into the viewable fractal-based structure may include selecting a visual attribute of an element of the viewable fractal-based structure according to the status of the first project task.

In some embodiments, a first file in the several files is associated with a first project task, and indicates that a status of the first project task is "spawning of a subtask." Accordingly, the method may further include receiving by the processor or a cloud-based system a second file corresponding to the subtask, modifying by the processor or the cloud-based system the file structure according to the subtask, and storing the second file in the modified file structure. The method may also include transmogrifying by the processor or the cloud-based system the modified file structure into a modified viewable fractal-based structure, and displaying by the processor or the cloud-based system the modified viewable fractal-based structure.

In some embodiments, the selected reference fractal-based structure may include several reference branches, each reference branch corresponding to a particular project task from a set of project tasks. A first reference branch may be associated with a first project task and may include a subset of the plurality of reference branches, where each reference branch in the subset corresponds to a respective sub-task associated with the first project task. A respective unique mnemonic may be associated with each reference branch, and the project file structure may include several folders, where each folder may be associated with a particular reference branch. A folder name of a folder associated with a particular reference branch may include the unique mnemonic associated with that particular reference branch. In some embodiments, the method includes receiving a new file having a filename that includes a filename mnemonic, identifying a reference branch in the selected reference fractal-based structure associated with a mnemonic matching with the filename mnemonic, and storing the new file in a folder associated with the identified reference branch.

In some embodiments, the viewable fractal-based structure includes several viewable branches, where each viewable branch corresponds to a particular reference branch in the several reference branches. Displaying the viewable fractal-based structure may include modifying a visual representation of a viewable branch corresponding to the identified reference branch. Modifying the visual representation may include: rendering the viewable branch, changing a color of the viewable branch, or adding a leaf to the viewable branch, where the leaf is associated with the new stored file.

In some embodiments, the method includes intercepting storage of a new file in a folder, where a filename of the new file includes a filename mnemonic. Additionally, the method may include identifying a mnemonic associated with a reference branch corresponding to the folder, and permitting the storage, if the filename mnemonic matches with the identified mnemonic, and otherwise preventing the storage. In some embodiments, where the filename mnemonic and the identified mnemonic are determined to have mismatched, the method further includes displaying a message prompting a user to change the filename or to select a different folder. Upon a response from the user, the method may include repeating the intercepting, identifying and permitting or preventing steps using a changed filename or the different folder. The message may include a suggested candidate filename or a suggested candidate folder.

In some embodiments, the viewable fractal-based structure includes several viewable branches, where each viewable branch corresponds to a particular reference branch in the several reference branches. Displaying the viewable fractal-based structure may include modifying a visual representation of a viewable branch that corresponds to a reference branch associated with the identified mnemonic. Modifying the visual representation may include rendering the viewable branch, changing a color of the viewable branch, or adding a leaf to the viewable branch, where the leaf may be associated with the new file.

In some embodiments, the viewable fractal-based structure includes an interactive fractal-based structure. The method may include, in response to selection by the user of an element of the interactive fractal-based structure, accessing and displaying a corresponding folder or file. The interactive fractal-based structure may be displayed in a first display panel. Moreover, the file structure may be displayed simultaneously in a second display panel. The method may include, in response to adding, deleting, or modifying by the user a file or a folder in the file structure, changing a visual attribute of a corresponding element of the viewable fractal-based structure. The method may also include searching for one or more files or folders based on a search term or a combination of terms. The file folder and/or associated files and folders may be retrieved by the processor or the cloud-based system, and subsequently displayed with annotations in the interactive structure that is displayed in a display panel. The annotations can be performed using color and/or other visual indicators, such as the use of highlighting, change in transparency etc.

In some embodiments, the viewable fractal-based structure includes an interactive two-dimensional structure or an interactive three-dimensional structure. Displaying the viewable fractal-based structure may include displaying the interactive two-dimensional structure or the interactive three-dimensional structure in a virtual reality (VR) environment. The viewable fractal-based structure may be displayed in a first panel in a multi-panel dashboard. The multi-panel dashboard may include a calendar, a team table, or a news feed, each corresponding to one or more tasks corresponding to at least a portion of the viewable fractal-based structure.

In some embodiments, the reference fractal-based structure includes a nature-based structure, and the viewable fractal-based structure includes the nature-based structure. The nature-based structure may include a tree structure or a plant structure, and the tree and/or plant structures may include a root structure.

In some embodiments, the transmogrification includes presenting one or more views of the file structure, where each view indicates the status or progress of one or more respective tasks of the specified project. Presenting a first view of the one or more views may include displaying a file folder in the file system using a first shape (e.g., a circle, square, rectangle, triangle etc.), wherein the file folder corresponds to a task or a subtask of the specified project. Presenting the first view may also include displaying a file in the file system using a second, different shape (e.g., a circle, square, rectangle, triangle etc.), wherein the file corresponds to an action associated with the task or the subtask.

In some embodiments, presenting the first view may include displaying a first file folder in the file structure in a first color or a first size and displaying a second file folder in the file structure in a second color or a second size. Alternatively or in addition, presenting the first view may include displaying a first file in the file structure in a first color or a first size and displaying a second file in the file structure in a second color or a second size. The first view can be one of task-status view, task-importance view, task-dependence view, project special aspects view, and filtered task status view. One or more views may be displayed side-by-side or may be aggregated and superimposed for the display thereof.

In another aspect, a system is for efficiently organizing, storing, accessing, and analyzing project data and for visualizing project progress. The system includes a processor and a display unit in electronic communication with the processor. The system can be a cloud-based system. The system also includes a memory in communication with the processor, where the memory includes instructions which, when executed by the processor, program the processor to: select for a specified project, a reference fractal-based structure based on, at least in part: (i) type of the specified project and (ii) a mapping between project types and reference fractal-based structures. The instructions also program the processor to organize and store several project files in a file structure corresponding to the selected reference fractal-based structure.

In addition, the instructions program the processor to transmogrify and digitally produce, based on at least in part an aspect ratio of the display unit, the file structure into a viewable fractal-based structure, and to display the viewable fractal-based structure on the display unit. In various embodiments, the processor may be programmed to perform one or more of the method steps described above.

DETAILED DESCRIPTION

Software Application

Figure 1:
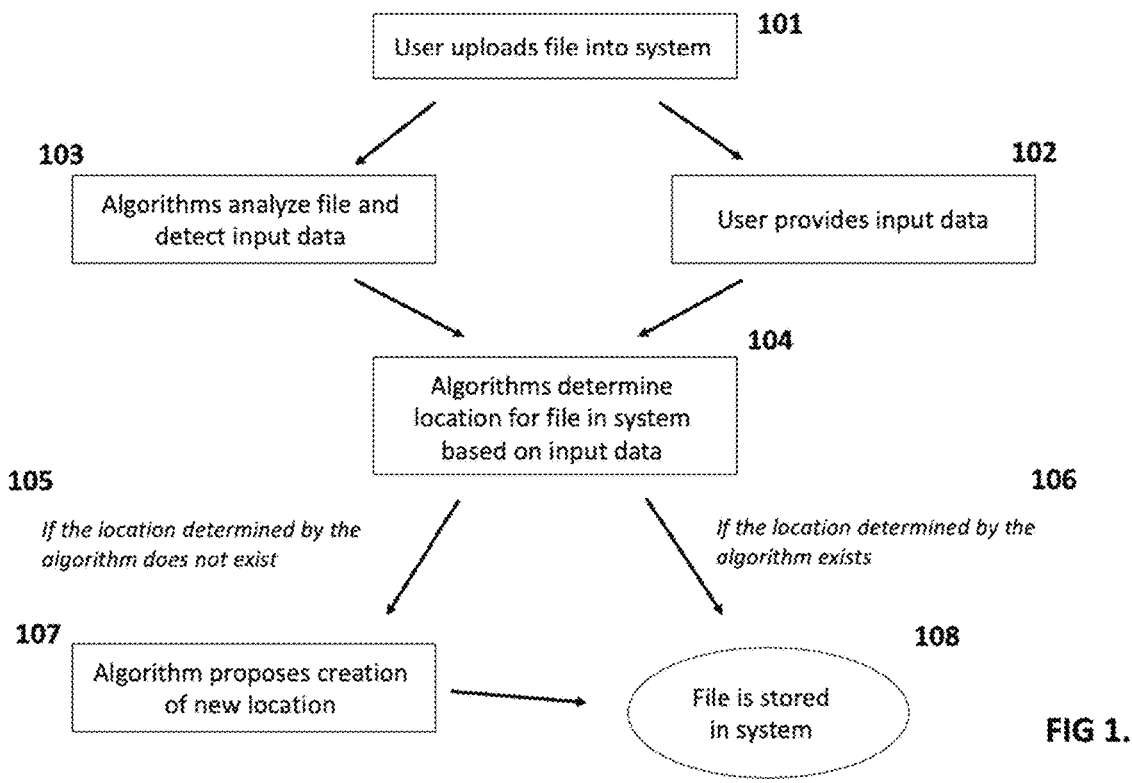
FIG. 1 shows an example flow process chart of the algorithm method.
Figure 2:
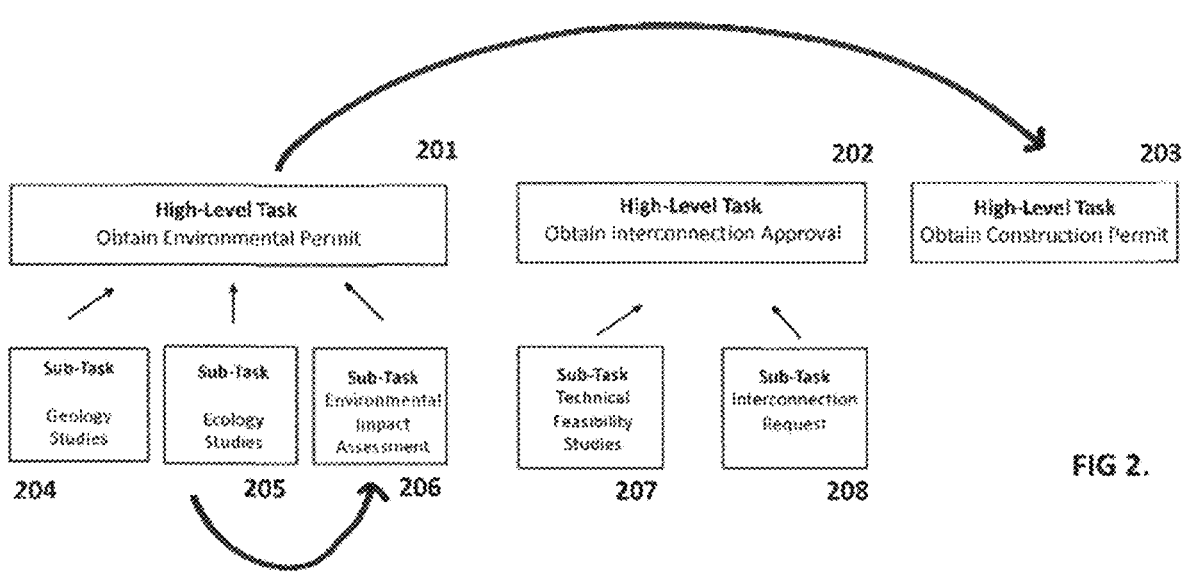
FIG. 2 shows an example hierarchy of high-level tasks, sub-tasks, and inter-related tasks.

In an example embodiment, a software application is provided that allows users to upload, sort, organize, store, access and view files and project data and visualize this information after transmogrification thereof. In an example embodiment, a user can access a web-browser application hosted by a service provider. In another embodiment, a user can download an application from a service provider to a smart device or virtual reality hardware. In another embodiment a user can download an application from a service provider to a computer desktop or virtual reality hardware. In yet another embodiment, the software can be downloaded or installed to a server.

In an example embodiment, the system allows humans to discuss, collaborate and work with project data in an efficient manner. The system enables opportunity identification, vision and strategic planning, project definition and oversight, and assessment feedback for project development.

In some embodiments, automated deep learning methods, artificial intelligence, or other similar smart learning algorithms are used to analyze the progress of a task or project through the file view. In some embodiments, these technologies and algorithms are used to forecast future events, such as the probability of project success based on data collected from the project and/or other projects in the system.

In some embodiments, transmogrification of the file structure includes an interactive visual time-series display which accesses and displays the historical status or progress of one or more respective tasks or an entire project at various points in time. In some embodiments, the display can visualize and playback a moving image showing the changes in status over a time range selected by the user. In these embodiments, the interactive display can be used to understand and present project progression.

In some embodiments, the interactive display shows a history of user interaction with a file, folder, or a number of files and folders. User interaction may include information about files and folders such as: date uploaded, user who uploaded the file/folder, date modified, type of modification, user responsible for modification, view count, identities of users who have viewed a particular file/folder, and other relevant data that may be stored by the processor or a cloud-based system. In some embodiments, the interactive display visualizes this information based on criteria set by a user using color and other visual indicators such as highlighting or transparency. For example, if a user sets the system criteria to display information on files and folders viewed by a first user in a specified time frame, a branch or leaf of the visual structure may be highlighted and displayed in a first color to signify that those branches and leaves met the specified criteria. In yet another embodiment, the interactive display may display the user interaction data for a specified file or folder within the structure when a user hovers a mouse icon over a particular file or folder. In some embodiments users are provided with specific icons that may include their photo, initials, name or another identifier. This information may be displayed as part of the visual information shown in the interactive display.

Algorithms

In an example embodiment, a series of algorithms can upload, sort, organize, store, search, access and view files. In an example embodiment, a file is uploaded to the system by a user FIG. 1 101. In some embodiments, the algorithms perform using input meta-data entered manually by the user 102. For example, input meta-data can include the file name, the project name, the file type, or a specific folder where the file belongs. In some embodiments, the algorithms can analyze the file to identify input data 103. For example, the algorithm can analyze text or numerical data contained within a file and perform according to this 103-104. Some examples of input data that the algorithms can identify within the file include project name, file date, and file type. An example of a file type is an environmental permit or a land lease.

In some embodiments the algorithm can sort and store the file based on user input meta-data 102, 104, 108 or from input meta-data derived from predictions based on the data analyzed within a file or other files within the system 103, 104. For example, the algorithm can identify a location for a file based on the location of similar files. In some embodiments, the algorithm can propose the creation of a new location for a file if a suitable location is not detected and store the file in the newly created location 105, 107, 108. In some embodiments, the algorithm may reject the file and may not upload the file into the system, if a suitable file name is not input or if a suitable location is not available or selected.

In some embodiments, the algorithm can store the file in the system if the location determined by the algorithm already exists 104, 108. In some embodiments, the algorithms can adjust their own parameters based on previous performance. In some embodiments the aforementioned actions can be performed according to a reference fractal-based structure. In an example embodiment, a reference fractal-based structure is a pre-defined hierarchy of folders that is used to sort and store files.

Example Project

In an example embodiment, the project can be a wind energy project. In another embodiment it can be a solar energy project, while in yet another embodiment it can be a real-estate construction project. In these example embodiments, large amounts of data and documentation are typically required in order to successfully develop, finance, and construct, inter alia, these projects.

In some embodiments, a project can have high level tasks FIG. 2 201-203, which are essential to the project. For example, some high-level tasks for a wind project include obtaining environmental 201, interconnection 202, and construction approvals 203, among others. High level tasks can also have sub-tasks 204-208. For example, in order to obtain an environmental approval, geology studies 204, ecology studies 205 and environmental impact assessments 206 need to be conducted. Similarly, in order to obtain interconnection approval 202, technical feasibility studies 207 must be conducted and requests for interconnection approval 208 must be submitted. Some tasks/subtasks, such ecological study may be essential, while other tasks, such as property value impact of newly installed power lines may be beneficial but optional.

In some embodiments, sub-tasks within a particular task can be inter-dependent. For example, the sub-task of conducting environmental impact assessments 206 cannot be initiated until the sub-task of conducting ecology studies 205 is completed. Similarly, different tasks can be inter-dependent. For example, in order to obtain a construction permit 203, an environmental permit 201 must first be obtained.

In an example embodiment, projects are assigned a 4-letter mnemonic based on their name. For example, a project named the Black Sea Wind Project can be assigned the 4-letter mnemonic name "BSWP." In some embodiments, projects mnemonics can be generated based on a geographic or industry-related factor. For example, a project's mnemonic could be derived from the 3-letter code of the nearest airport with a $4^{th}$ letter signifying the type of project. In this manner, a hotel project located in Odessa, where the nearest airport bears the code ODS, could be assigned the mnemonic "ODSH." A project type could be hotel, wind farm, bridge construction, among others. In some embodiments, the user can manually assign the mnemonic. In some embodiments, the system can automatically generate a mnemonic.

In an example embodiments, tasks and sub-tasks can also be assigned a mnemonic. For example, environmental tasks can be assigned the mnemonic "ENVS" and sub-tasks of approvals or studies can be assigned the mnemonics of "APRV" and "STUD," respectively. In some embodiments users can manually create and assign specific mnemonics to tasks and sub-tasks. In some embodiments, algorithms can analyze a file and automatically generate mnemonics based on data within the file. In yet another embodiment, algorithms can automatically generate mnemonics based on past feedback and comparing a file against other files in the system.

Reference Based Structures

A reference structure is a pre-defined structure for sorting and organizing folders, subfolders, and files. In an example embodiment, reference structures employ fractal geometry. In another example embodiment, reference structures employ a Lindenmayer system. In yet another example embodiment, reference structures can be defined by hierarchical, force directed, and other sorting methods for large number networks.

Reference Fractal-Based Structure

Figure 3:
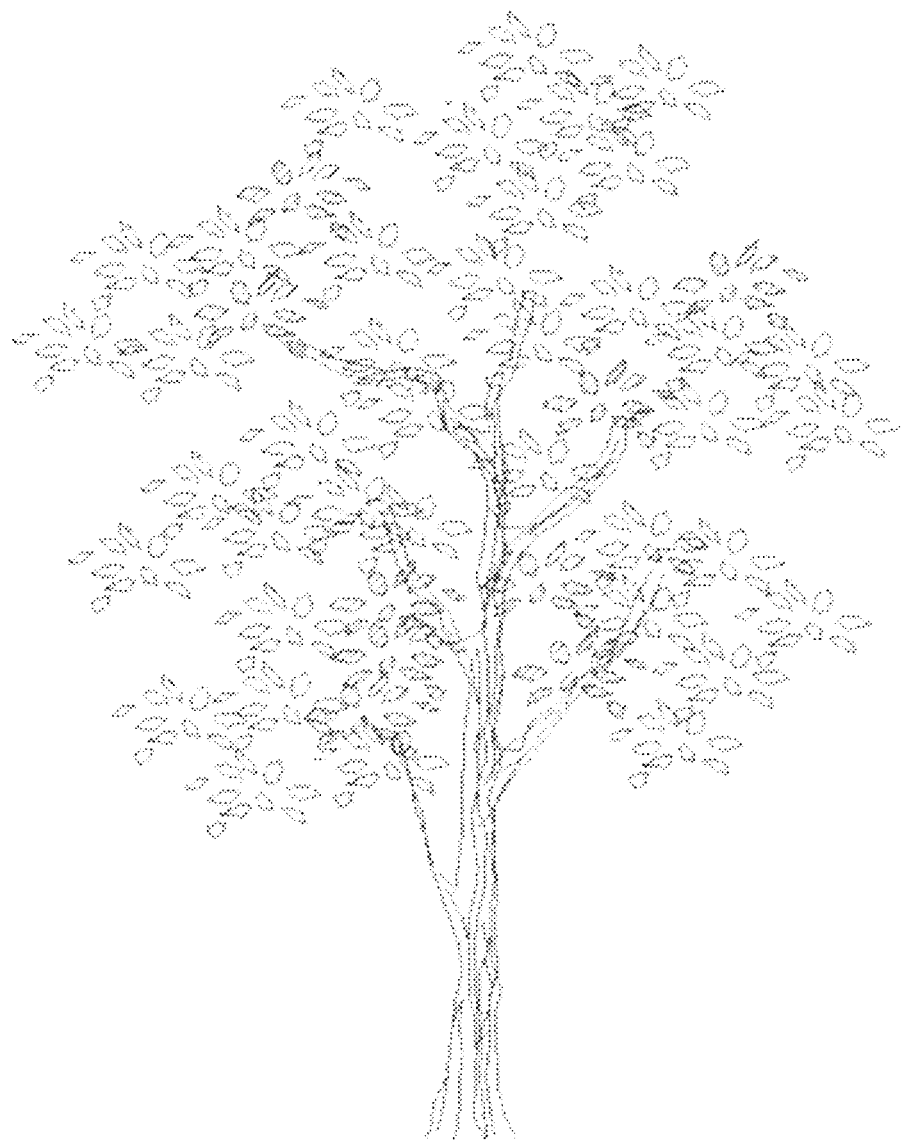
FIG. 3 shows an example of a reference fractal-based structure according to an example embodiment.
Figure 4:
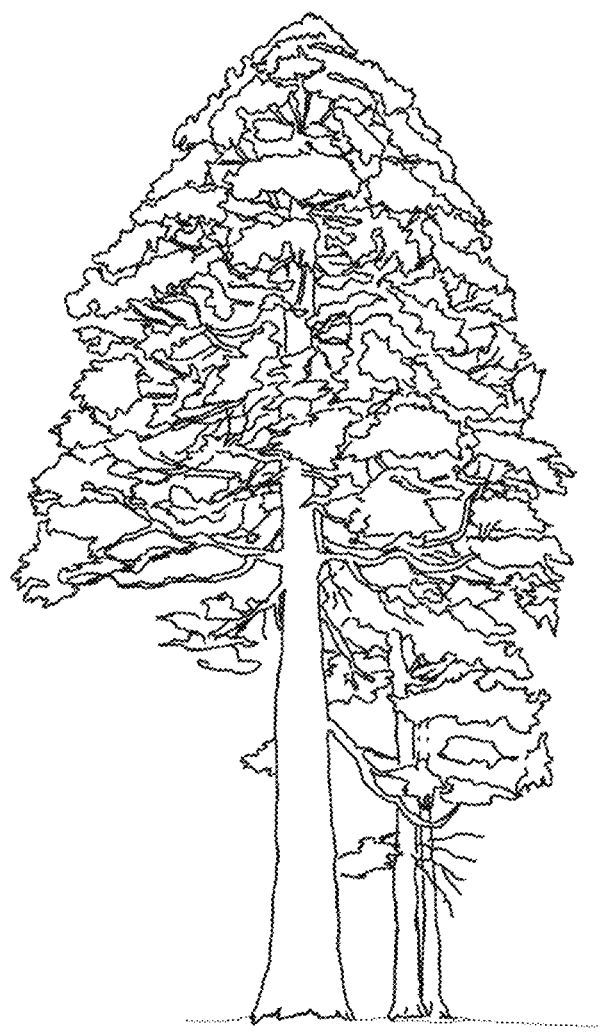
FIG. 4 shows an example of a reference fractal-based structure according to an example embodiment.
Figure 5:
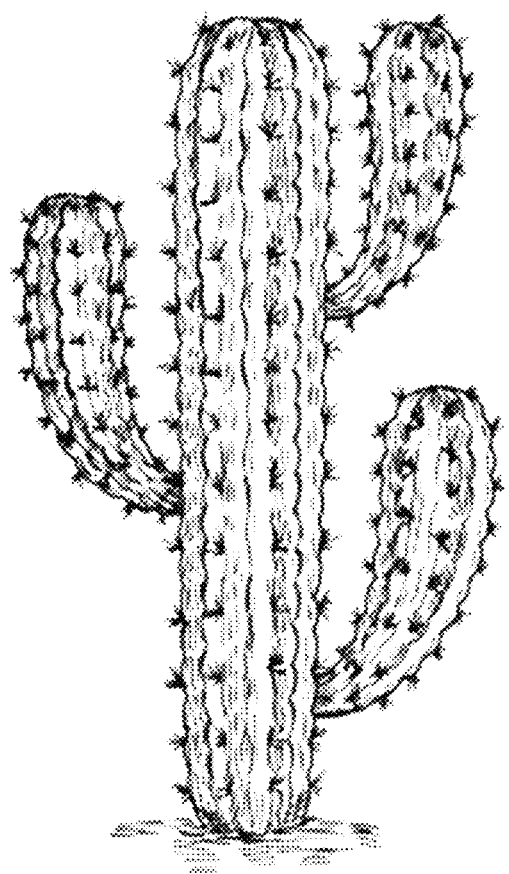
FIG. 5 shows an example of a reference fractal-based structure according to an example embodiment.
Figure 6:
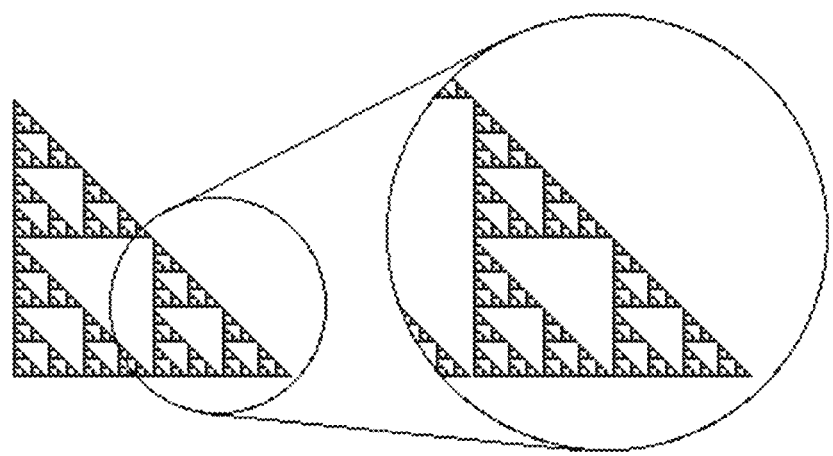
FIG. 6 shows an example of the fractal geometry concept of self-similarity.

In an example embodiment, a user selects a reference fractal-based structure based on the project type. A reference structure is a pre-defined structure for sorting and organizing folders, subfolders, and files. Examples of a reference fractal-based structure include a deciduous tree (FIG. 3), a sequoia tree (FIG. 4), a cactus (FIG. 5) or another fractal natural structure that features self-similarity (made up of smaller copies of itself) (FIG. 6).

In an example embodiment the reference fractal-based structure is comprised of branches, sub-branches, leaves, roots, and other features (FIGS. 3-6). In some embodiments, the reference-structure can be edited manually. For example, a user can add, delete or reposition attributes of the reference structure including branches, sub-branches and leaves.

In an example embodiment, project types are associated with different kinds of reference structures. For example, various wind projects may be associated with deciduous tree reference structures. In another example, various solar projects may be associated with cactus reference structures.

In an example embodiment, projects of the same type can be associated with the same reference structures, but the reference structure can appear differently based on project specific inputs. For example, two different wind projects can use a deciduous tree reference structure. One wind project might be located in an emerging market with cumbersome documentation requirements for obtaining a construction permit. In this case, over 10,000 files related to construction permit documentation might need to be sorted and uploaded. The second wind project might be located in a developed market with fewer construction permit requirements. This project might require that 1,000 files related to construction permit are sorted and uploaded. Consequently, the deciduous tree reference structure used for Project 1 might have longer branches and more sub-branches to accommodate the larger number of files and increased complexity of the Project 1 compared to the deciduous tree reference structure used for Project 2.

Folder Structure

In an example embodiment, each particular task and sub-task corresponds to a folder or sub-folder with each folder and sub-folder (FIG. 7 703) corresponding to a branch or sub-branch 704 on the reference fractal-based structure (FIGS. 3-6). In the same respect, files 705 correspond to leaves or needles 706 on the reference structure.

In an example embodiment, the folder and sub-folder names can include the mnemonics of the corresponding tasks and sub-tasks. For example, if a mnemonic of "ENVS" is used for environmental tasks, then the environmental tasks folder name can be assigned the mnemonic "ENVS." Similarly, if the sub-task of conducting a study is assigned the mnemonic "STUD," then the sub-folder for environmental studies can be assigned the mnemonics "ENVS" and "STUD."

Viewable Fractal-Based Structure

Figure 8:
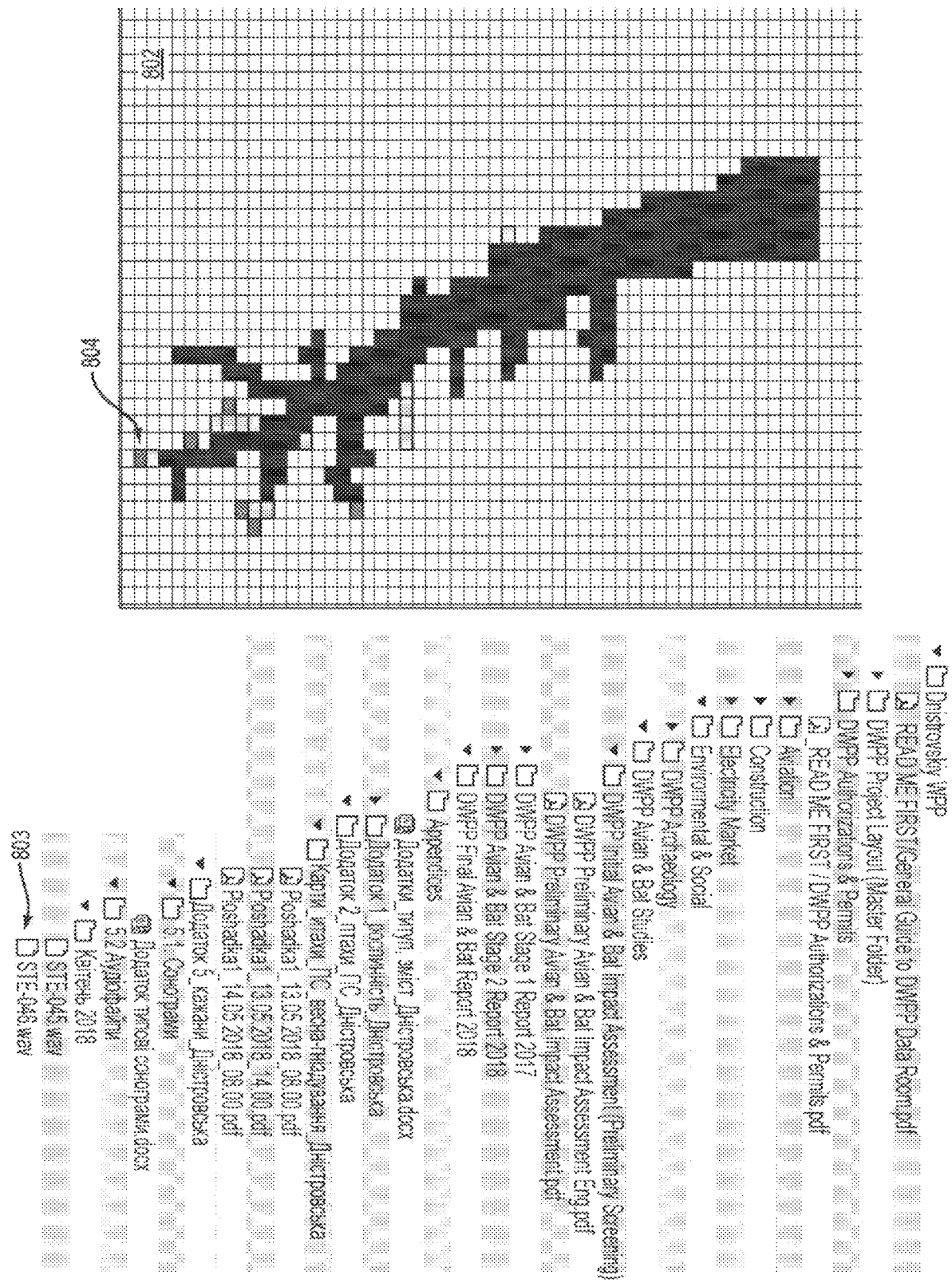
FIG. 8 shows an example folder and file structure compared to an example viewable fractal-based structure according to an example embodiment.
Figure 9:
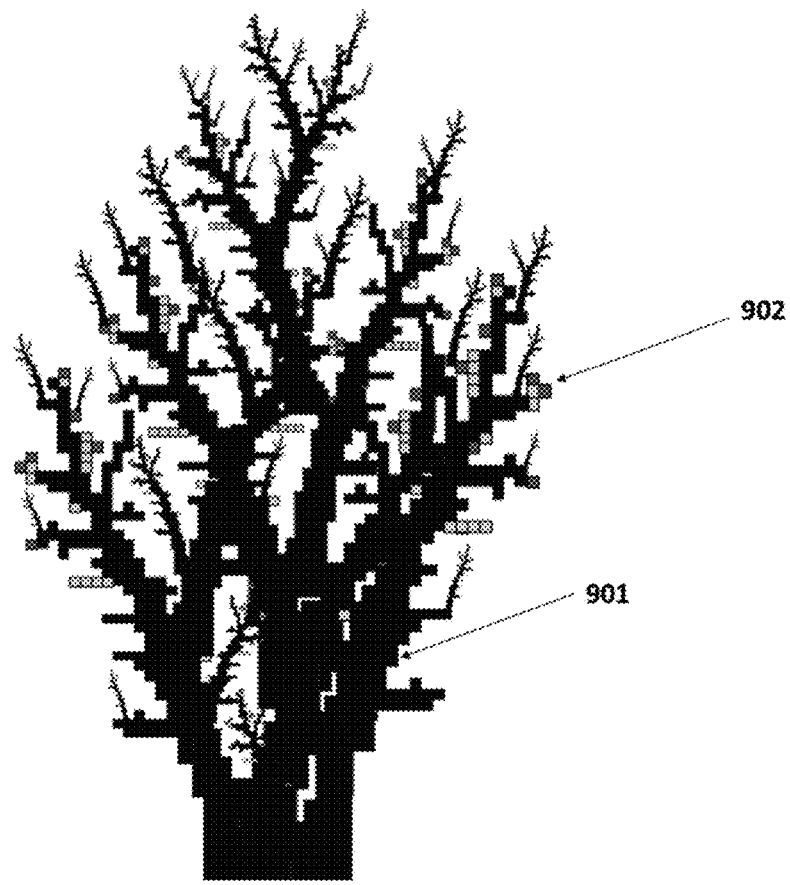
FIG. 9 shows an example viewable fractal-based structure according to an example embodiment.
Figure 10:
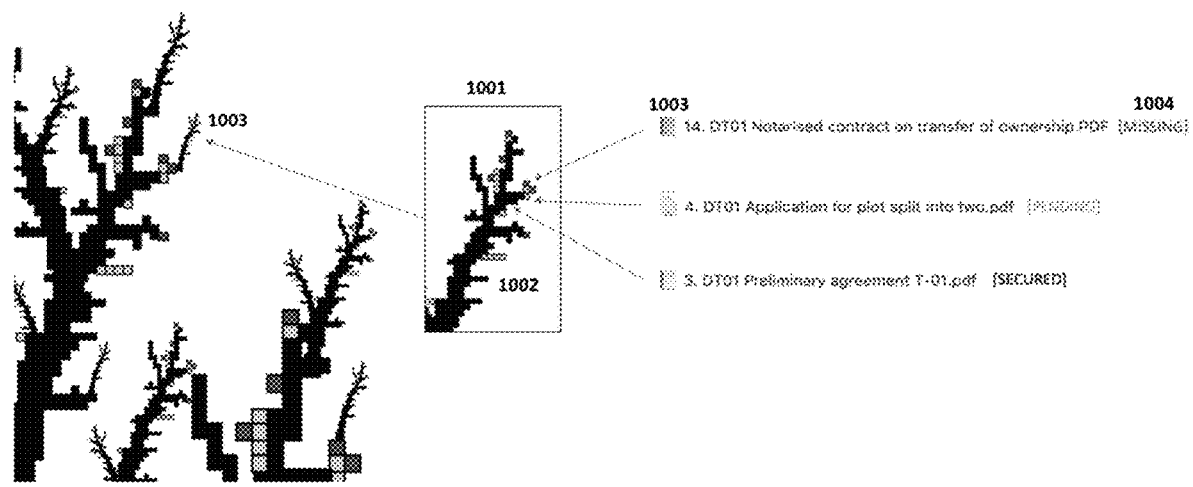
FIG. 10 shows a detail of an example viewable fractal-based structure according to an example embodiment with hyperlinks and annotations.

In an example embodiment, the reference fractal-based structure is viewable. FIG. 9 shows an overview of an example of a viewable fractal-based structure with branches and sub-branches As seen in FIG. 8, branches of the reference structure 802 can include sub-branches, sub-sub-branches, and so forth since the reference structure is fractal based. These branches and other sub-branches 802 are associated with a particular folder or sub-folder in the underlying reference structure as shown in 801. The branches and sub-branches of the viewable fractal-based structure 802 are hyperlinked, as shown in FIG. 10 1003, to the associated content.

In an example embodiment, any branch or sub-branch on the viewable fractal-based structure can have leaves or needles 804, where each leaf or needle is associated with a particular file on the underlying reference structure 803 and can be linked to that file.

In an example embodiment, the size and shape of a branch or sub-branch on the viewable reference-structure is determined by the number of sub-folders contained within the corresponding folder or sub-folder. For example, if a branch corresponds to a folder which contains many sub-folders, then the branch will be long with the requisite number of sub-branches to correspond to the sub-folders. Similarly, if a folder or sub-folder has many files, then the corresponding branch or sub-branch will have many leaves or needles. In some embodiments, the size of a branch or sub-branch can be determined by the weighted importance of the task, as defined by the reference fractal-based structure.

File Management

In an example embodiment, a user can name a file according to the mnemonics assigned to the project and ask the system to store the file. The system algorithms will select the appropriate folder or sub-folder according to the filename, by selecting a branch or sub-branch with the mnemonic(s) that match the filename. The system will then store the file in the folder or sub-folder that is associated with that branch or sub-branch.

In an example embodiment, if a user attempts to manually add a file to the folders and sub-folders within the reference structure, the system will verify whether the filename and any mnemonics assigned to the filename match the mnemonic(s) associated with the selected branch. In some embodiments, if there is a mismatch, the system may prompt the user to create a new branch or sub-branch if a branch with matching mnemonics does not exist. This new branch would be assigned a mnemonic and the system would simultaneously generate a new folder or sub-folder corresponding to this branch. The file would be stored in the new folder or sub-folder. For example, if a user tries to add a land lease file to the environmental studies sub-folder with the mnemonics "ENVS" and "STUD," folder for land documents does not exist already, the system would prompt the user to create land folder with a new mnemonic. An example of this new mnemonic is "LAND."

If a mismatch occurs when a user tries to manually add a file, but an existing folder or sub-folder matches the mnemonics of the file, the system will prompt the user to assign the file to the matching folder or sub-folder.

Transmogrification

Figure 12:
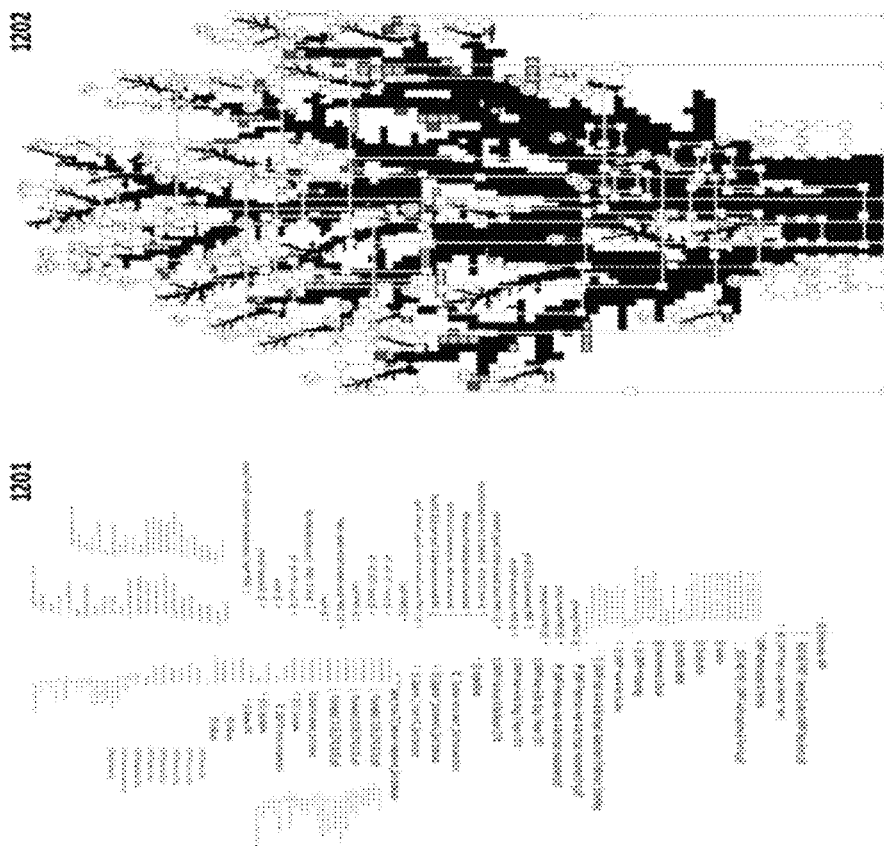
FIG. 12 shows an example of the transmogrification of an example folder structure and the resulting example viewable fractal-based structure according to an example embodiment.

In an example embodiment, the visual transmogrification of the file structure into the viewable fractal-based structure communicates information about project data and the project status to the user. FIG. 12 shows an example transmogrification of an example underlying file structure with folders and files 1201 to an example viewable fractal-based structure with branches, sub-branches, and leaves 1202.

In an example embodiment, information about project data and project status is conveyed through the use of color and visual changes to the viewable fractal-based structure. For example, when a project is complete, the viewable fractal-based structure can be shown in green. In some embodiments, a branch of the viewable fractal-based structure is only visible when a file associated with that branch is stored.

In some embodiments, a branch (and its sub-branches, leaves or needles) is shown as a color or texture before files are added. For example, referring again to FIG. 9, the entire viewable fractal-based structure could be "grayed-out" or black 901 when branches do not contain any associated files. When a file is stored, the corresponding branch or sub-branch can change color. For example, when the first file is added to the branch it can turn orange. When additional files are added to the branch it can turn yellow 902, eventually turning to green when all key files are added. In some embodiments if a file is added, modified, or deleted the color of the leaf corresponding to the change. For example, if a file is not updated within a pre-set period of time, the leaf can turn brown.

In some embodiments, color or attributes of a color, including brightness, saturation, and intensity, can be used to signify if a file is missing or requires attention. For example, if a high-level task or file is missing and is required in order to obtain another file or complete another task, then the corresponding branch and/or leaf can be bright red 902. In some embodiments, rather than changing the color, other visual indicators may be used such as changing the shading of the shape representing the file/folder, adding a pattern to the shape, changing a single-line border of the shape to a double-line border, changing the size of the shape, etc.

Figure 7:
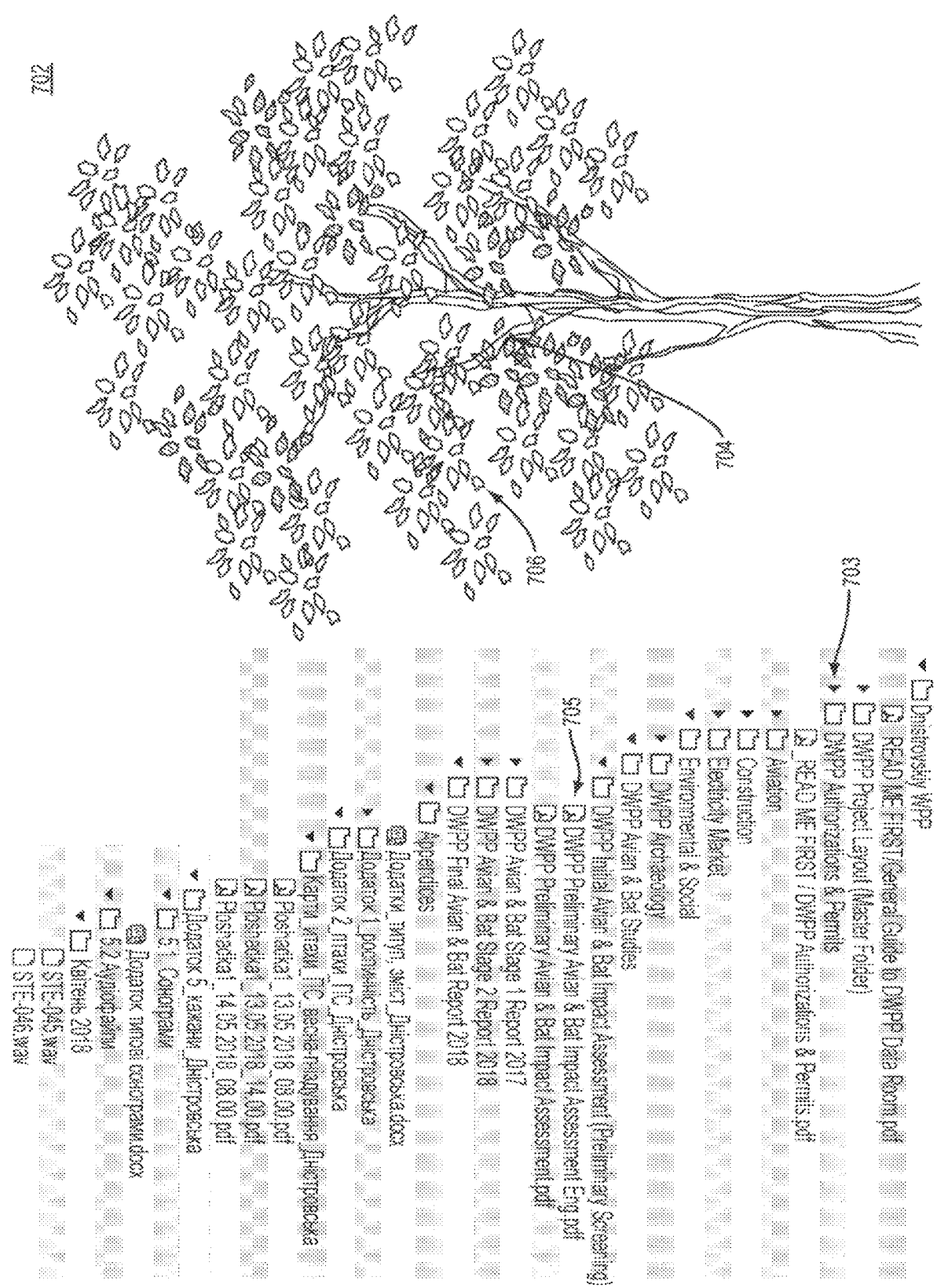
FIG. 7 shows an example file structure compared with an example reference fractal-based structure according to an example embodiment.

In the file and folder structure depicted in FIGS. 7, 8, and 12, the files and folders, along with their respective names, appear inverted so that the file/folder structure can be visually compared to the corresponding reference tree structure. In some embodiments, the file/folder names are shown right-side up for readability, even though the file/folder structure is inverted, i.e., the root folder is at the bottom, and the branches leading to subfolders, sub-sub-folders, and files expand upward. In some cases, the file/folder structure is shown right side up, i.e., with the root folder on top and the branches expanding downward, and the reference structure may be inverted to facilitate visual comparison.

It should be understood that FIGS. 7, 8, and 12 illustrate the structure of the file system. An analysis of the overall structure of the file system, to determine whether the file-system structure resembles or differs from a reference structure, does not typically depend on the particular names of the file(s) and/or folder(s). In general, however, as described above, a naming convention or scheme may be imposed on the names of different folder(s) and/or file(s).

Interactive User Interface (UI)/Virtual Reality (VR) Interface

In an example embodiment, there is an interactive user interface where the viewable fractal-based structure and the underlying file system interact. In some embodiments, the interactive user interface is displayed using virtual reality hardware and becomes a virtual reality interface. For example, a viewer could use a virtual reality headset to view the user interface. The virtual reality interface can be displayed in 2 and/or 3-dimensions.

In an example embodiment, a folder or file can be displayed when the corresponding branch, leaf or needle is clicked. In some embodiments, a corresponding branch or leaf is highlighted upon selecting or opening a particular file. In an example embodiment, a user can zoom in and out of the viewable fractal-based structure. In some embodiments, when users zoom in on a branch or area of the structure, additional sub-branches, leaves and needles that were assigned as lower priority can appear. For example, this could include low-level tasks or sub-sub-sub-folders that cannot be displayed when the entire viewable fractal-based structure is shown.

Figure 11:
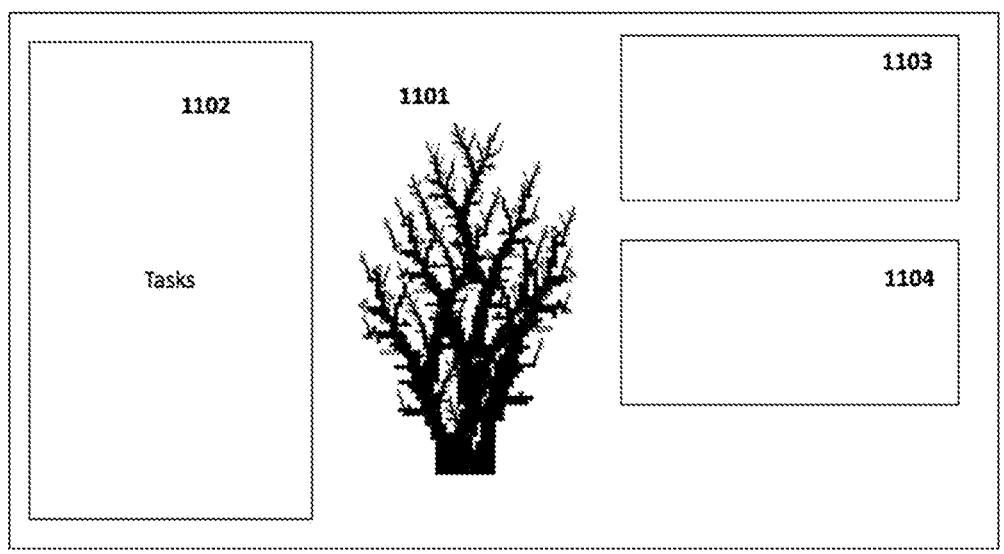
FIG. 11 shows an example dashboard according to an example embodiment.

In another embodiment, users can navigate along the branches and sub-branches of the viewable fractal-based structure with annotations about the corresponding tasks and information about the status or progress of the tasks appearing. In an example embodiment, a dashboard FIG. 11 presents the viewable fractal-based structure and other visual information. In some embodiments, the viewable fractal-based structure if featured in the center of the dashboard 1101. In some embodiments, the viewable fractal-based structure can be moved and rearranged on the dashboard by a user.

In an example embodiment, the dashboard features a task panel 1102 where users can add tasks or to-do items. Tasks can be sorted in a variety of ways. For example a user can sort by personal tasks. The user can also sort by team tasks or tasks for a specific project or sub-group within an organization.

In an example embodiment, the with a calendar 1103 listing the tasks corresponding to at least a portion of the viewable fractal based structure. In some embodiments the calendar lists tasks by upcoming date or date past due. In some embodiments the calendar lists tasks based on which branch(es) of the viewable fractal-based structure are selected. In an example embodiment, the dashboard features a news feed 1104 related to the tasks. In some embodiments the news feed displays the most recent news or updates. In some embodiments the news feed is filtered by criteria including relevance, priority, project, or topic, among others.

In some embodiments, a system according to the techniques described herein provides feedback on project data in terms of the status of the tasks. For example the system according to some embodiments can determine the status of a particular task/subtask based on the presence or absence of a particular file, a feature that is lacking in conventional systems. Another example of feedback on data can be an indication provide to a user that a permit that was previously obtained is no longer valid. In some embodiments, the system can determine this by recognizing a permit expiration date in the permit file and by comparing the expiration date with the current date. In yet another example, the system may become aware of new law or regulation that is effective as of a certain date and that may make certain project documents outdated/invalid.

In various embodiments, the system can provide visual feedback on the impact that external events and information may have on the project data. Examples of external events and information include macroeconomic data or events, news events, political events, etc. In some embodiments, the system communicates with external sources to access relevant information. Additionally, or in the alternative, the external information may be input by the user(s).

In some embodiments, the system may analyze the macroeconomic data, news events, political events, etc., and may determine whether these events/data are relevant to the stored projects data, and then provide feedback on which project data is impacted. For example, in some embodiments, the system scans RSS feeds and/or other newsfeeds to identify the type of information noted above. As an example, suppose the system extracts information from an RSS feed that the World Bank will now offer highly incentivized financing opportunities for utility scale alternative energy in OECD countries. If the system is managing project(s) in an OECD country, the system may provide an alert that those project(s) may be eligible for the new financing opportunity. The system may update its fractal-based structure to represent new tasks and data associated with this new information.

In some embodiments, the project/task management system can infer and depict relationships between the project data that is being viewed by a particular user at a particular time, and project data contained in closed folders and sub-folders, that are not viewed by the user at that time. In general, using conventional systems a user cannot see the "bigger picture." For example, consider a user viewing the contents of a construction drawer/folder. Unless the user has prior knowledge of the project, or has previously opened other drawers/folders and has reviewed the contents thereof, the users may not know that other drawers/folders may contain documents that are relevant to those in the construction drawer/folder, such as, e.g., financing documents, environmental documents, etc. The user of a conventional system may also not know about any task dependencies between the tasks to which the documents in the different folders relate, and the status of various such tasks and subtasks.

For example, a physical office drawer or file folder in a conventional system cannot tell a user that prior to undertaking a particular task/subtask (e.g., submitting Environmental Impact Assessment (EIA)), the user must wait until the prerequisite task(s)/subtask(s) (e.g., obtaining the approval for a Detailed Plan of Territory) is/are completed. Note that the EIA and DPT documents in this example would most likely be stored in two completely different folders and siloed in traditional systems. For example, one set of documents may be in the environmental matters folder the other set of documents may be in the land matters folder.

In various embodiments, the reference fractal-based structure would be aware of these relationships and can provide visual feedback to the user about the status of the related folders and associated tasks while accessing a particular folder. For example, upon accessing a document in environmental matters folder, an embodiment of the system can display the status of the tasks associated with the document(s) in the land matters folder. Specific dependencies between tasks and subtasks may be annotated based on the presence/absence of the file(s) that are related to such tasks and subtasks and that may be located in the same or different folders.

In some embodiments, a relationship of a document in one folder/subfolder to a document in another folder/subfolder, where there is not task dependency between the tasks corresponding to those documents, may be presented to a user. For example, if a user notices that a land lease was approved by a particular government agency, the user can then request all other documents related to the project that are also signed by that government agency. In general, the project data may be filtered using a suitable filter, e.g. (an approving agency) and, in response, the leaves and branches on the tree that contain the relevant mnemonics and/or documents corresponding to selection/filtering criteria would be highlighted.

Figure 13A:
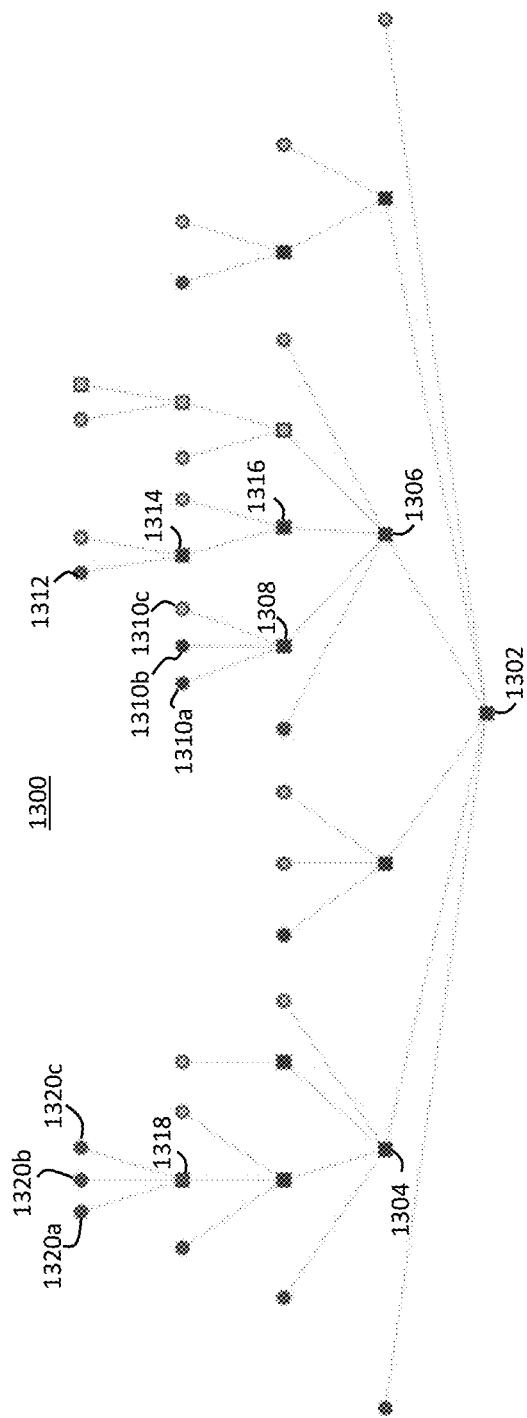
FIGS. 13A-13D depict different views, according to different embodiments, of a transmogrified file system corresponding to an example project.

FIG. 13A illustrates transmogrification of a file structure underlying an example project into a viewable fractal-based structure that corresponds to a reference fractal-based structure corresponding to the project. In particular, in the viewable fractal-based structure 1300, the project folders are represented by squares (e.g., 1302, 1304, 1308, 1312 etc.), and the project files are represented as circles 1310a-1310c, 1314a-1314c, etc. In general, the folders may represent tasks, subtasks, sub-sub-tasks etc. of the project, and the files may represent the operations or actions required to complete a particular task or a subtask. The entire project may be represented by a root-level folder, i.e., the folder 1302.

For example, the root-level folder may represent a project of constructing a new hydro-electric power plant. A project of this scale would naturally include several tasks. For instance, task 1304 may represent constructing access roads to transport dam construction materials, turbine equipment, and electrical power distribution equipment to the project site. Task 1306 may represent environmental impact analysis of the project. Each of these and other tasks may include subtasks, where one or more subtasks may include one or more lower level subtasks. A particular task or a subtask may include one or more actions that must be taken and completed in order to complete the task or subtask.

In a task-status view, transmogrification may include color coding folders and files corresponding to various tasks, sub-tasks, and actions so as to provide a visual indication of the respective status of one or more tasks, subtasks, and/or actions. For example, in FIG. 13A, the folder 1308 (may also be referred to as a subfolder) is marked green, indicating that the associated particular subtask is on schedule. Two actions that are required by the particular subtask are indicated as completed by marking the corresponding files 1310a, 1310b green. Another action that is also a part of the particular subtask has not been completed, but is in progress and on-schedule. As such, the file 1310c corresponding to that action is marked yellow.

A file 1312 is marked red indicating that the corresponding action has not commenced yet. That action is a part of a subtask corresponding to a subfolder 1314, where that subtask itself is a part of another subtask corresponding to a subfolder 1316. Even though the file 1312 is marked red, the subfolders 1314, 1316 are marked green, indicating that the fact that the action corresponding to the file 1312 is not yet complete does not adversely affect the subtasks corresponding to the subfolders 1314, 1316. It also indicates, however, that the action corresponding to the file 1312 is pending and may need to be completed in due course.

As discussed above, a viewable fractal-based structure representing an underlying file structure generally corresponds to a reference fractal-based structure. In the foregoing example for instance, many tasks and subtasks associated with the construction of a hydro-electric power plant may be generally known, where this knowledge can be used to provide a reference fractal-based structure. Often, however, a large project may have some peculiarities that are not present in other similar projects. Transmogrification can highlight such peculiarities.

For example, the site of the project described with reference to FIG. 13A may be a mountainous region. As such, in order to build an access road, it may be necessary to blast off a small mountain top or to construct a series of tunnels. A typical task of constructing access roads, as represented by the folder 1304, may not involve a subtask of constructing a tunnel, which is represented by the subfolder 1318 and the files 1320a-1320c contained in the subfolder 1318. As such, the reference fractal-based structure may not include an analog to the subfolder 1318 and to the files 1320a-1320c. As such, during transmogrification of the actual file structure associated with the particular hydro-electric power plant construction project at hand, in a project special aspects view, the subfolder 1318 and the files 1320a-1320c may be marked red, to provide a visual indication that some of the subtasks of the project are different from those in the reference fractal-based structure.

It should be understood that different transmogrifications may be provided in different views. For example, the tunnel construction tasks and actions may be peculiar to the project at hand but may be on-schedule. As such, in the task-status view (also called task-progress view), the subfolder 1318 and the files 1320a-1320c may not be marked red. In the project special aspects view (also called project peculiarities view), however, the subfolder 1318 and the files 1320a-1320c may be marked red, as discussed above.

Figure 13B:
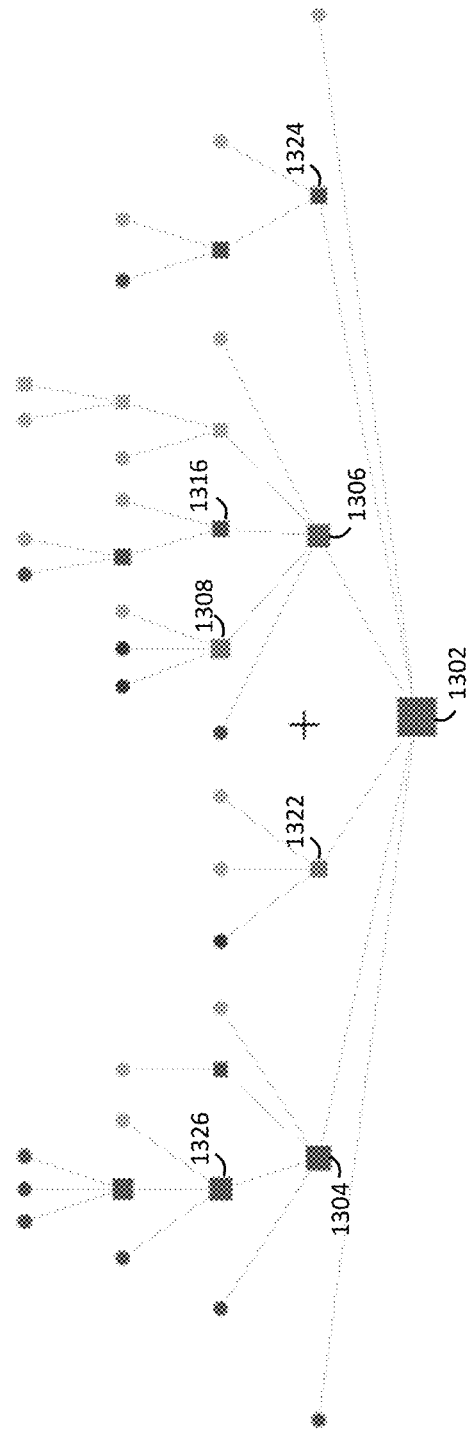

FIG. 13B is another transmogrification view, called task-importance view, that indicates information about the relative importance of various tasks and subtasks so that it can be readily determined whether the relatively important tasks or on-schedule, delayed, or stalled. For example, the tasks corresponding to the folders 1304, 1306, 1322, and 1324 are the main tasks of the project represented by the root-folder 1302. In FIG. 13B, the folders 1304 and 1306 are shown to be larger than the folders 1322 and 1324, indicating that the tasks corresponding to the folders 1304 and 1306 are relatively more important than the tasks corresponding to the folders 1322 and 1324. In fact, the size of the subfolder 1326 is the same as that of the folder 1304, indicating that the subtask corresponding to the subfolder 1236 is more important than the tasks corresponding to the folders 1322 and 1324. Likewise, the task-importance view indicates that the relative importance of the tasks/subtasks corresponding to the folders/subfolders 1308, 1316, 1322, and 1324 is approximately the same.

Using the information presented in the task-importance view in combination with the information provided in the task-status view, it can be readily visualized if any important tasks are delayed or stalled. To this end, in some embodiments, the two views may be depicted side-by-side. In some embodiments, the two views may be aggregated using a combination of different sizes and different colors.

Figure 13C:
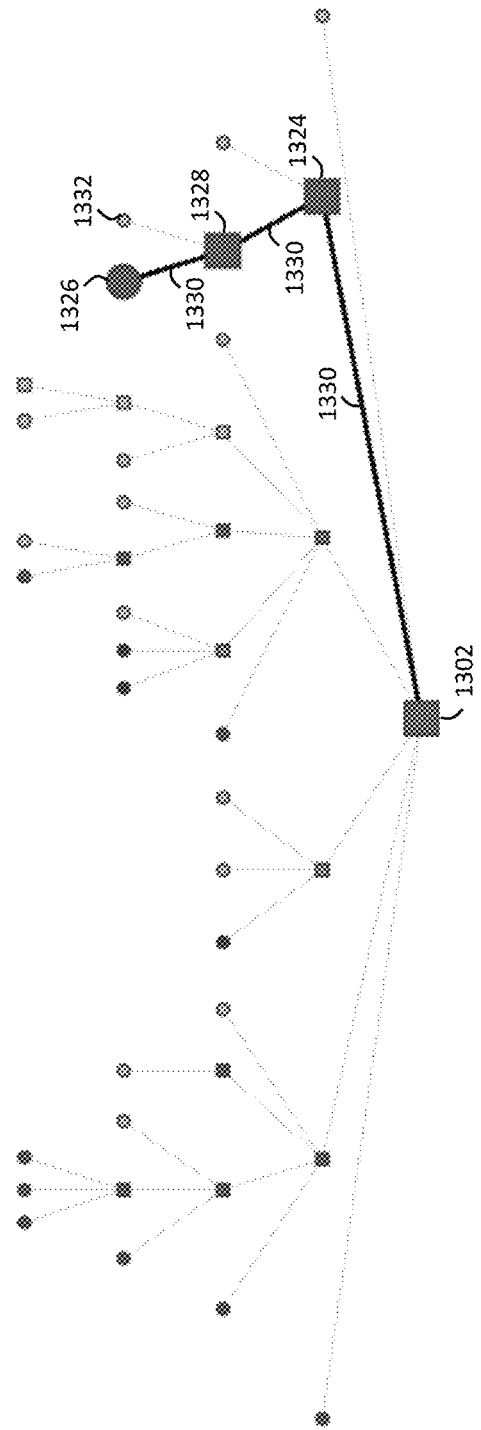

FIG. 13C depicts a task-dependence view for the project described with reference to FIG. 13A. In particular, if the transmogrification system determines that the representation of a particular file, e.g., the file 1326, is to be changed to indicate a change in the status of that file, not only the appearance of the circle 1326 representing the file but also the respective appearances of the different subfolders and folders, leading up to the root folder 1302, to which the file 1326 belongs, are changed. In addition, the lines indicating the path 1330 from the root folder 1302 up to the file 1326, passing via folders 1324, 1328, may be highlighted. The change in the appearance of a folder/subfolder can be a change in color and/or size of the square (a shape, in general) representing the folder.

This transmogrification can inform a user how the change in the status of a file may impact other folders and their associated tasks. The change in the status of a file (e.g., the file 1326) can be the creation of a new file, deletion of an existing file, or modification of the contents of a file. As one example, if the contents of the file 1326 indicate that financing required for the subtask represented by the folder 1328 has become available, an action corresponding to a file 1332, where that action is part of the subtask represented by the folder 1328, may be commenced.

Figure 13D:
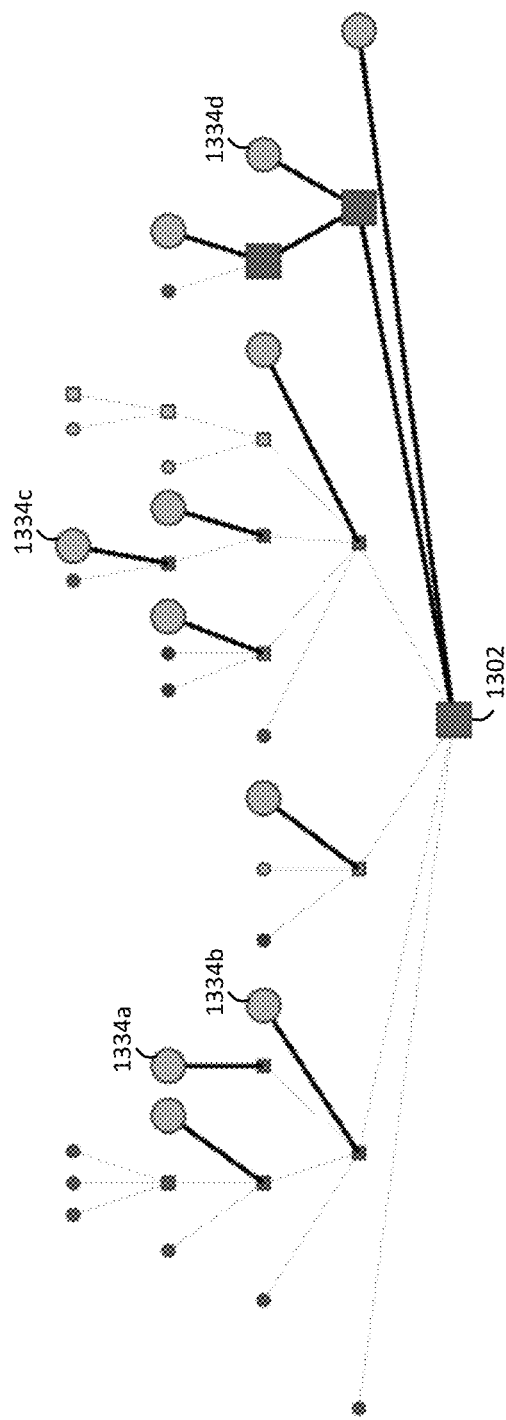

FIG. 13D depicts a filtered task status view for the project described with reference to FIG. 13A. Here, one or more files indicative of a particular status may be selected. For example, a number of different tasks/subtasks may require inspection by respective inspectors, such as building inspectors, insurance inspectors, etc. With each such task/subtask, a respective file may indicate whether the inspection is complete and approved, complete but awaiting certification, inspection is requested and is pending, inspection is yet to be approved, etc.

A filter may be used to select one or more files indicative of a particular status of interest, such as, e.g., inspection is requested and is pending. The filter may highlight the files indicating the selected status, such as files 1334a-1334d. In addition, the filter may also highlight the folders and subfolders containing the highlighted files, and the paths from the highlighted files to the root folder 1302. The highlighting of these folders, subfolders, files, and paths can inform a user the tasks and subtasks that correspond to the highlighted folders and subfolders, where such tasks and subtasks may need attention.

The different views described above with reference to FIGS. 13A-13D, and the filtering described with reference to FIG. 13D may be selected and/or controlled via a suitable graphical user interface (GUI). To show that a particular file, folder, or path is selected, or to show that the status of a particular file and/or folder has changed, the color or properties of the color (e.g., saturation, brightness, hue, etc.) of that file/folder may be changed. Alternatively, other visual indicators may be used such as changing the shading of the shape representing the file/folder, adding a pattern to the shape, changing a single-line border of the shape to a double-line border, changing the size of the shape, etc.

A complex project typically involves several tasks and subtasks. Many different kinds of data are also typically associated with a complex project. Examples of such data include, but are not limited to, field observations and tests data, lab tests, analysis and reports derived from such data, filings seeking approvals for undertaking certain tasks and subtasks, granted, conditional, or denied approvals, documents relating to financing of certain tasks/subtasks, etc. These data are typically stored in a database that may provide conventional information such as the identity of the creator of a file, personnel who accessed and/or modified the file or created versions thereof, dates and times at which the file was created, accessed, modified, etc.

Conventional file systems or database systems typically do not link the progress of different tasks and subtasks to the data files associated with the project. Likewise, project management tools typically provide information about the status and progress of different tasks and subtasks only, without any links to the data associated with the different tasks and subtasks.

The transmogrification techniques according to various embodiments that are described herein feature a technical effect and benefit of inferring and providing a visualization of status and progress of different tasks and subtasks associated with a project from the existence, lack of existence, and/or contents of data files associated with the project. Another technical effect and benefit of the transmogrification techniques, according to some embodiments described herein, is that rather than presenting the database of the project data as a mere collection of folders, subfolders, and files, the file structure underlying the project data is presented as a growing tree that allows for visualization of project progress.

Yet another technical effect and benefit is that by associating the tree with a reference tree that corresponds to the class of projects to which the particular project at hand belongs, a visual representation can be provided, where the visual representation may indicate whether the project is progressing in a similar manner as other projects in its class or is changing in one or more peculiar ways.

The inferencing and representation of the progress of the project using the file structure underlying the project data can be more informative and intuitive. It also provides the technical effect and benefit of providing an enriched database or a file structure, by incorporating therein a different kind of time dimension that is not limited only to informing when a particular file/folder was created, accessed, and/or modified.

A computing system used to implement various embodiments may include general-purpose computers, vector-based processors, graphics processing units (GPUs), network appliances, mobile devices, or other electronic systems capable of receiving network data and performing computations. A computing system in general includes one or more processors, one or more memory modules, one or more storage devices, and one or more input/output devices that may be interconnected, for example, using a system bus. The processors are capable of processing instructions stored in a memory module and/or a storage device for execution thereof. The processor can be a single-threaded or a multi-threaded processor. The memory modules may include volatile and/or non-volatile memory units.

The storage device(s) are capable of providing mass storage for the computing system, and may include a non-transitory computer-readable medium, a hard disk device, an optical disk device, a solid-date drive, a flash drive, or some other large capacity storage devices. For example, the storage device may store long-term data (e.g., one or more data sets or databases, file system data, etc.). The storage device may be implemented in a distributed way over a network, such as a server farm or a set of widely distributed servers, or may be implemented in a single computing device.

The input/output device(s) facilitate input/output operations for the computing system and may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices. In some examples, mobile computing devices, mobile communication devices, and other devices may be used as computing devices.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Various embodiments and functional operations and processes described herein may be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface (GUI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting. The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for efficiently organizing, storing, searching, accessing, and analyzing project data and for visualizing project progress, the method comprising steps of:
   selecting for a specified project, a reference fractal-based structure based on, at least in part: (i) type of the specified project and (ii) a mapping between project types and reference fractal-based structures;

organizing and storing by a processor a plurality of project files in a file structure corresponding to the selected reference fractal-based structure;

transmogrifying by the processor the file structure into a digitally produced viewable fractal-based structure; and displaying by the processor the viewable fractal-based structure.

2. The method of claim 1, wherein:
the viewable fractal-based structure corresponds to the reference fractal-based structure,
wherein the reference fractal-based structure: (i) comprises a nature-based structure; (ii) is based on a set of organization principles and frameworks, or (iii) is based on a Lindenmayer system.

3. The method of claim 1, wherein:
a first file in the plurality of files is associated with a first project task; and
the viewable fractal-based structure comprises a first branch corresponding to the first project task.

4. The method of claim 1, wherein a first file in the plurality of files is associated with a first project task, the first file indicating that a status of the first project task is spawning of a subtask, the method further comprising:
receiving by the processor a second file corresponding to the subtask;
modifying by the processor the file structure according to the subtask;
storing the second file in the modified file structure;
transmogrifying by the processor the modified file structure into a modified viewable fractal-based structure; and
displaying by the processor the modified viewable fractal-based structure.

5. The method of claim 1, wherein:
the selected reference fractal-based structure comprises a plurality of reference branches, each reference branch corresponding to a particular project task from a plurality of project tasks;
a first reference branch is associated with a first project task and comprises a subset of the plurality of reference branches, each reference branch in the subset corresponding to a respective sub-task associated with the first project task;
a respective unique mnemonic is associated with each reference branch; and
the project file structure comprises a plurality of folders, each folder being associated with a particular reference branch.

6. The method of claim 1, wherein the viewable fractal-based structure comprises an interactive fractal-based structure.

7. The method of claim 1, wherein the viewable fractal-based structure comprises an interactive two-dimensional structure or an interactive three-dimensional structure.

8. The method of claim 1, wherein:
the viewable fractal-based structure is displayed in a first panel in a multi-panel dashboard; and
the multi-panel dashboard comprises a calendar, a team table, or a news feed, each corresponding to one or more tasks corresponding to at least a portion of the viewable fractal-based structure.

9. The method of claim 1, wherein:
the reference fractal-based structure comprises a nature-based structure; and
the viewable fractal-based structure comprises the nature-based structure, wherein:
the nature-based structure comprises a tree structure or a plant structure, each of the tree and plant structures comprising a root structure.

10. The method of claim 1, wherein:
the transmogrifying comprises presenting one or more views of the file structure, each view indicating status or progress of one or more respective tasks of the specified project.

11. A system for efficiently organizing, storing, accessing, and analyzing project data and for visualizing project progress, the system comprising:
a processor;
a display unit in electronic communication with the processor; and
a memory in communication with the processor and comprising instructions which, when executed by the processor, program the processor to:
select for a specified project, a reference fractal-based structure based on, at least in part: (i) type of the specified project and (ii) a mapping between project types and reference fractal-based structures;
organize and store a plurality of project files in a file structure corresponding to the selected reference fractal-based structure;
transmogrify and digitally produce, based on at least in part an aspect ratio of the display unit, the file structure into a viewable fractal-based structure; and
display the viewable fractal-based structure on the display unit.

12. The system of claim 11, wherein:
the viewable fractal-based structure corresponds to the reference fractal-based structure,
wherein the reference fractal-based structure: (i) comprises a nature-based structure; (ii) is based on a set of organization principles and frameworks, or (iii) is based on a Lindenmayer system.

13. The system of claim 11, wherein:
a first file in the plurality of files is associated with a first project task; and
the viewable fractal-based structure comprises a first branch corresponding to the first project task.

14. The system of claim 11, wherein:
a first file in the plurality of files is associated with a first project task, the first file indicating that a status of the first project task is spawning of a subtask; and
the instructions further program the processor to:
receive a second file corresponding to the subtask;
modify the file structure according to the subtask;
store the second file in the modified file structure;
transmogrify the modified file structure into a modified viewable fractal-based structure; and
display the modified viewable fractal-based structure.

15. The system of claim 11, wherein:
the selected reference fractal-based structure comprises a plurality of reference branches, each reference branch corresponding to a particular project task from a plurality of project tasks;
a first reference branch is associated with a first project task and comprises a subset of the plurality of reference branches, each reference branch in the subset corresponding to a respective sub-task associated with the first project task;
a respective unique mnemonic is associated with each reference branch; and
the project file structure comprises a plurality of folders, each folder being associated with a particular reference branch.

16. The system of claim 11, wherein the viewable fractal-based structure comprises an interactive fractal-based structure.

17. The system of claim 11, wherein the viewable fractal-based structure comprises an interactive two-dimensional structure or an interactive three-dimensional structure.

18. The system of claim 11, wherein the instructions program the processor to:
display the viewable fractal-based structure in a first panel in a multi-panel dashboard,
wherein the multi-panel dashboard comprises a calendar, a team table, or a news feed, each corresponding to one or more tasks corresponding to at least a portion of the viewable fractal-based structure.

19. The system of claim 11, wherein:
the reference fractal-based structure comprises a nature-based structure; and
the viewable fractal-based structure comprises the nature-based structure, wherein:
the nature-based structure comprises a tree structure or a plant structure, each of the tree and plant structures comprising a root structure.

20. The system of claim 11, wherein to transmogrify, the instructions program the processor to:
present one or more views of the file structure, each view indicating status or progress of one or more respective tasks of the specified project.

* * * * *